April 11, 1961
E. E. REED ET AL
2,979,134
CORE HOLE TESTING APPARATUS
Filed May 20, 1955
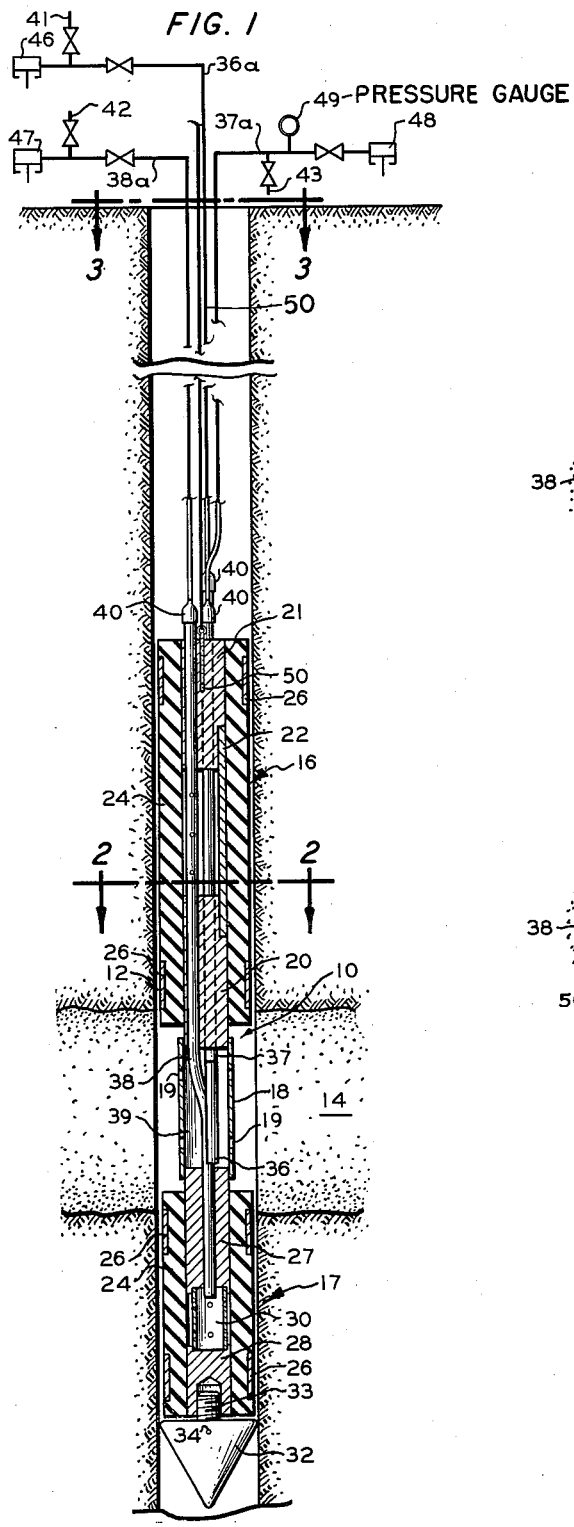
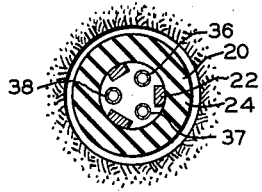
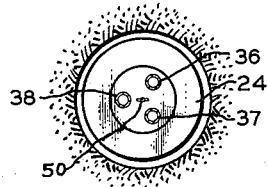
INVENTORS
E.E. REED
C.T. BRANDT
BY Hudson and Young
ATTORNEYS United States Patent Office 2,979,134
Patented Apr. 11, 1961

2,979,134

CORE HOLE TESTING APPARATUS

Edwin E. Reed and Carl T. Brandt, Bartlesville, Okla., assignors to Phillips Petroleum Company, a corporation of Delaware Filed May 20, 1955, Ser. No. 509,776

7 Claims. (Cl. 166—187)

This invention relates to an improved core hole testing apparatus for use in obtaining samples of fluid from a selected earth formation and in testing the permeability of a selected earth formation to a selected fluid.

The use of underground storage sites for the storage of various products, particularly products of the petroleum and chemical industries, has become rather extensive. Such usage has made it necessary to obtain information on underground storage sites relative to the character and nature of the surrounding formation. In obtaining such information it is essential that any core holes drilled be pressure tested to determine the permeability of the various formations penetrated. During the operation of the storage unit it is advisable to check the surrounding area for the presence of escaping product and if evidence of leakage is found to isolate and thus determine the level and source of leakage. We have devised an apparatus which has particularly high utility in carrying out such determinations.

The principal object of the invention is to provide an improved apparatus for core hole testing. Another object is to provide an improved apparatus for core hole testing which readily and efficiently obtains a representative sample of fluid, either gas or liquid, from a selected formation. Another object is to provide core hole testing apparatus which can be run by hand without the use of a drilling rig. A further object of the invention is to provide an improved apparatus for testing the permeability of a selected earth formation. It is also an object of the invention to provide an improved apparatus for testing the permeability of a selected earth formation to a selected fluid. Other objects of the invention will become apparent from a consideration of the accompanying disclosure.

We have devised and constructed a core hole tester comprising a pair of inflatable spaced-apart packers adapted to seal off a confined sampling and testing zone in a core hole at the level of a selected formation, means for inflating the packers so as to seal the same against the wall of the hole, a first sampling conduit extending through the upper packer from a point thereabove to the upper section or top of the sampling zone, a second sampling conduit extending through the upper packer from a point thereabove to the lower section or bottom of the sampling zone, and tubes connecting the sampling conduits with the ground surface. The inflating means comprises a conduit extending from a point above the upper packer to the inflatable area inside the lower packer, with perforations in the portion of this conduit within the inflatable area of the upper packer, and a tube connecting this inflating conduit with the ground level. Each of the packers comprises a pair of spaced-apart cylindrical plugs connected by rubber tubing which overlaps at least a substantial portion of the cylindrical surface of the plugs. A tapered guide at the lower end of the lower packer having a maximum cross section substantially equal to that of the uninflated packers facilitates lowering the packer assembly into the hole. The entire packer unit is suspended in the hole on a wire cable.

More complete understanding of the invention may be had by reference to the accompanying detailed drawing of which Figure 1 is an elevation in partial cross section of a preferred embodiment of the core hole testing apparatus of the invention positioned in a core hole; Figure 2 is a transverse cross section taken on the line 2—2 of Figure 1; and Figure 3 is a transverse section taken on the line 3—3 of Figure 1.

Referring to Figure 1, a core hole testing device 10 is shown in a core hole 12 opposite a selected formation 14. The testing device comprises a pair of inflatable packers 16 and 17 connected by a pipe 18 provided with holes 19 positioned adjacent or near the ends thereof. Upper packer 16 comprises a pair of plugs 20 and 21 separated and rigidly connected by a plurality of solid spacers 22. Plugs 20 and 21 are also connected and surrounded by an impervious rubber tube 24 which is secured to the plugs at the ends by means of banding clamps or cylindrical rings 26 which do not extend beyond the outer surface of the tubes. Packer 17 is constructed similarly to packer 16 and comprises plugs 27 and 28 separated and rigidly connected by a perforate conduit or pipe 30. A generally conical guide 32 having a base substantially the diameter of the uninflated packers is rigidly attached to the lower end of plug 28 by means of a threaded axially extending section 33 which screws into a tapped hole in plug 28 axially thereof. A pair of diametrically opposed drill holes 34 in member 32 provide access for a spanner wrench for inserting and removing this member.

A series of three conduits 36, 37, and 38 are symmetrically positioned in plugs 21 and 20, 120 degrees apart and spaced apart from both the circumference and the center of the plugs. Conduit 37 terminates in the upper section adjacent the top of the sampling zone 39 enclosed by pipe 18, while conduit 36 extends to the lower section adjacent the bottom of this sampling zone. Conduit 38 changes its path or position within pipe 18 so that it enters and traverses plug 27 axially thereof and terminates in the enclosed zone within pipe 30 between plugs 27 and 28. Conduit 38 is perforate between plugs 20 and 21 and is open at its lower terminus. Conduits 36, 37, and 38 communicate with the ground level through tubes 36a, 37a, and 38a, respectively, to which they are connected by suitable connectors 40. Each of these tubes is provided with a cut-off valve as shown and also with valved auxiliary lines or tubes 41, 42 and 43. Tubes 36a, 37a, and 38a are connected with pumps 46, 47, and 48, respectively, which are adapted to supply fluid, either gas or liquid, under pressure to their respective tubes and to the zones with which they are connected through conduits 36, 37, and 38. A pressure-sensing device or gage 49 is positioned in tube 37a for determining and recording the pressure of the fluid in the confined zone between the inflated packers and is utilized in ascertaining and determining the permeability of the formation being tested for any particular fluid. The apparatus is suspended in the core hole by means of wire cable 50 which is attached to the upper end of plug 21.

Referring to Figure 2, this figure shows the relative positions of rigid solid spacers 22 and conduits 36, 37, and 38 in plug 20. The conduits are 120 degrees apart as are the spacers and the radial center line through each spacer is 60 degrees from the radial center line through the adjacent conduit.

Figure 3 shows the relative positions of conduits 36, 37, and 38 in plug 21 and also that of suspension cable 50.

A device corresponding with that shown in the drawing was constructed and operated in core hole sampling and testing in accordance with the invention. Plugs 20, 21, 27, and 28 were solid brass 1 3/16" in diameter by 4" in length, which were drilled for 1/4" O.D. copper tubing, to serve as conduits 36, 37, and 38 positioned 1/2" between centers and 120° apart. Plugs 20 and 21 were connected by solid brass strips 22 constructed 1/8" thick, 1/4" wide, and 28" long so as to overlap each plug a distance of 2" or half the length thereof. Packer 17 was constructed of identical plugs except for the drilling which included a 1/4" axial hole in plug 27 and a 27/64" hole in plug 28, tapped 1/2"–13NC–2. Plugs 27 and 28 were connected as shown in the drawing by steel pipe 30 which was cut 24" long and inserted in the plugs 1/8 of an inch. This pipe was fabricated of 3/8" seamless steel pipe and drilled with 1/4" holes as shown. Pipe 18 was fabricated of 3/4" seamless steel pipe 60" in length with holes 19 positioned 1 1/4" from the ends of the pipe. Pipe 18 overlapped plugs 20 and 27 1/4". Tubes 24 were constructed of gum rubber tubing to fit the packer plugs and having a wall 1/2" in thickness. Conduits 36, 37, and 38 were connected to their respective tubes by standard 1/4" copper tubing connectors as shown in the drawing. Tubes 36a, 37a, and 38a were of standard 1/4" I.D. high pressure (600#) flexible hose. All joints were welded or brazed as shown in Figure 1. Airplane cable 1/8" in diameter was utilized as cable 50 in suspending the apparatus in the hole.

The device described was utilized in testing and sampling in core holes of nominal 1 7/8" diameter thereby eliminating the need for conventional heavy pipe and was run by hand thereby eliminating the need for a rig. In operation the device was lowered into the core hole to a predetermined level opposite a formation to be sampled and/or tested and, when at the proper level, compressed air was introduced through tube 38a and conduit 38 into the inflatable packers 16 and 17 so as to seal off a section of the hole between the packers as a confined sampling and testing zone. In testing for permeability the valve in tube 36a was closed and a selected fluid was introduced to the confined testing zone through tube 37a and conduit 37. The permeability was determined by the rate at which the pressure, as indicated on instrument 49, diminished. Of course, if the permeability was negligible, this fact was determined by the maintenance of pressure without substantial loss. Tests were made to determine the permeability of various formations to water, air, and gasoline.

In testing for leakage in a dry core hole drilled in a formation in the proximity of a subterranean storage unit, the packer was positioned and inflated as previously described and any escaping gas was readily recovered as it rose through tube 37a. In some instances the test was expedited by blowing air down tube 36a in conduit 36 and the air emerging from tube 37a was tested for traces of gas which might have escaped from the subterranean storage unit.

In testing for leakage in a wet hole, the packer was positioned and inflated as before. Air pressure was applied to the confined zone between the packers through tube 37a and conduit 37 so as to force water from the confined space out through conduit 36 and tube 36a. After removal of the water the confined zone was allowed to refill with water from the formation and this water was blown out in the manner just described and, since it provided a truly representative sample of the infiltering water from the formation opposite the sampling zone, it was suitable for testing and was so utilized to detect the presence of any fluid which escaped from the underground storage unit.

In testing the permeability of a formation to a specific fluid, the fluid within the confined section between the packers was forced out by the test fluid. The valve in tube 36a was then closed allowing the pressure of the test fluid to build up in the confined testing zone. Observation of instrument 49 indicated the permeability of the formation to the particular fluid.

The invention is not limited to the specific embodiment actually constructed and described, it being understood that various modifications in the construction of the device are within the skill of the art. However, the constructed device is highly advantageous in testing in small bore core holes thereby providing advantages in economy of equipment required and in economy in drilling the small core hole such as one of 1 7/8" nominal diameter as compared with the conventional core hole of 3 1/2" diameter. The tester may be operated successfully with a clearance in the range of about 1/8" to 3/8" between the uninflated packers and the wall of the hole.

We claim:

1. Core hole testing apparatus comprising an upper inflatable packer and a lower inflatable packer adapted to seal off a confined sampling and testing zone between said packers and the wall of a core hole, each packer comprising a pair of spaced-apart coaxial cylindrical plugs connected by a rubber tube surrounding at least the adjacent end sections of said plugs in sealed relation therewith, and including rigid supporting means connecting the lower plug of the upper packer with the upper plug of the lower packer; means for inflating said packers; a first conduit extending through said upper packer from a point above same to the upper section of said sampling zone; and a second conduit extending through said upper packer from a point above same to the lower section of said sampling zone.

2. The apparatus of claim 1 including rigid support means connecting the plugs of each packer.

3. The apparatus of claim 2 wherein the rigid supporting means connecting said lower plug with said upper plug comprises a pipe substantially the diameter of said plugs and rigidly attached to the adjacent end sections of said plugs, said pipe having openings adjacent the ends of the sampling zone for admitting fluid into said pipe and said first and second conduits terminating within said pipe.

4. Core hole testing apparatus in a core hole in an earth formation comprising an upper inflatable packer and a lower inflatable packer each adapted to form a seal with the wall of the hole to provide a confined sampling and testing zone between said packers and the wall of the hole, each packer comprising a pair of spaced-apart coaxial cylindrical plugs connected by a rubber tube surrounding the adjacent ends of said plugs and sealed therewith; an inflating conduit passing through both plugs of said upper packer and continuing into the inflatable space between the plugs of the lower packer, said conduit being perforate in the inflating space between the plugs of the upper packer; a first sampling conduit passing through said upper packer and terminating in the upper section of said sampling zone; a second sampling conduit passing through said upper packer and terminating in the lower section of said sampling zone; rigid support means connecting said packers; a tube connecting said inflating conduit with a source of pressurizing fluid at ground level; a tube connecting said first sampling conduit with a source of fluid at ground level; a valved tube leading from said second sampling conduit to ground level; and a cable affixed to the upper plug of said upper packer leading to ground level for raising and lowering the apparatus.

5. The apparatus of claim 4 wherein said upper packer comprises a pair of elongated metal plugs connected by three elongated metal bars spaced-apart 120° circumferentially, overlapping said plugs, and imbedded therein so that the outer surface thereof is flush with the cylindrical surface of said plugs, the three conduits passing through said plugs being spaced apart 120° and spaced from said bars 60°.

6. The apparatus of claim 5 wherein said lower packer comprises a pair of elongated metal plugs connected by an elongated perforate coaxial metal pipe rigidly attached to the adjacent ends of said plugs, and wherein said rigid support means comprises a metal pipe overlapping the lower end of the lower plug of the upper packer and the upper end of the upper plug of the lower packer, last said pipe being perforate adjacent the end sections of said sampling zone and enclosing the sections of the aforesaid conduits extending into said sampling zone.

7. The apparatus of claim 6 including a generally conical metal guide rigidly attached to the lower end of the lower packer, the maximum diameter of said guide being substantially that of the uninflated packers.

References Cited in the file of this patent

UNITED STATES PATENTS

| | | |
|---|---|---|
| 1,168,757 | Squires | Jan. 18, 1916 |
| 2,409,674 | Graybeal | Oct. 22, 1946 |
| 2,473,713 | Kingston et al. | June 21, 1949 |
| 2,607,425 | Taylor | Aug. 19, 1952 |
| 2,609,878 | Halliburton | Sept. 9, 1952 |
| 2,629,446 | Freling et al. | Feb. 24, 1953 |
| 2,633,015 | Morris | Mar. 31, 1953 |
| 2,652,717 | Bush et al. | Sept. 22, 1953 |

FOREIGN PATENTS

| | | |
|---|---|---|
| 49,349 | France | Nov. 12, 1938 |